United States Patent
Park

(10) Patent No.: US 9,830,873 B2
(45) Date of Patent: Nov. 28, 2017

(54) LIQUID CRYSTAL DISPLAY INCLUDING REACTIVE MESOGEN ALIGNMENT LAYER AND A BLUE PIXEL WITH A DECREASED MAXIMUM GRAY LEVEL AND DRIVING METHOD THEREOF

(71) Applicant: Samsung Display Co., Ltd., Yongin-si, Gyeonggi-Do (KR)

(72) Inventor: Kyung Ho Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 342 days.

(21) Appl. No.: 14/747,638

(22) Filed: Jun. 23, 2015

(65) Prior Publication Data

US 2016/0196790 A1    Jul. 7, 2016

(30) Foreign Application Priority Data

Jan. 7, 2015    (KR) .................. 10-2015-0001982

(51) Int. Cl.
*G09G 3/36* (2006.01)
*G02F 1/13* (2006.01)

(52) U.S. Cl.
CPC ............ *G09G 3/3648* (2013.01); *G02F 1/13* (2013.01); *G09G 2300/0447* (2013.01); *G09G 2320/0242* (2013.01); *G09G 2320/0673* (2013.01)

(58) Field of Classification Search
CPC ......... G09G 3/3648; G09G 2320/0242; G09G 2300/0447; G02F 1/13
See application file for complete search history.

(56) References Cited

U.S. PATENT DOCUMENTS

| | | | | |
|---|---|---|---|---|
| 8,674,919 B2* | 3/2014 | Shimoshikiryoh | .. | G09G 3/3648 345/92 |
| 9,013,771 B2* | 4/2015 | Park | ......................... | H04N 9/73 358/1.9 |
| 2010/0053197 A1* | 3/2010 | Gabrielson | ............ | G09G 5/026 345/593 |
| 2012/0105785 A1* | 5/2012 | Kim | ..................... | G09G 3/3648 349/139 |
| 2013/0307759 A1* | 11/2013 | Jang | ....................... | H01L 27/322 345/76 |
| 2015/0022750 A1* | 1/2015 | Ogawa | ...................... | G02F 1/13 349/43 |
| 2015/0168787 A1* | 6/2015 | Yang | ................. | G02F 1/134309 349/138 |

FOREIGN PATENT DOCUMENTS

| | | |
|---|---|---|
| JP | 2009-276435 A | 11/2009 |
| KR | 10-2005-0087267 A | 8/2005 |
| KR | 10-2006-0126196 A | 12/2006 |
| WO | 2008/018552 A1 | 2/2008 |

* cited by examiner

Primary Examiner — Ryan A Lubit
(74) Attorney, Agent, or Firm — H.C. Park & Associates, PLC

(57) ABSTRACT

Provided is a liquid crystal display including: a liquid crystal panel assembly including a plurality of pixels; a data driver applying data voltages to a plurality of data lines connected to the plurality of pixels; and a signal controller generating image data signals to provide the generated image data signals to the data driver, in which the plurality of pixels includes a reactive mesogen (RM) alignment layer formed on a display panel, and the signal controller generates the image data signals by adjusting the data voltage with the maximum gray applied to the blue pixel to be decreased by a predetermined level.

20 Claims, 9 Drawing Sheets

LIQUID CRYSTAL DISPLAY INCLUDING REACTIVE MESOGEN ALIGNMENT LAYER AND A BLUE PIXEL WITH A DECREASED MAXIMUM GRAY LEVEL AND DRIVING METHOD THEREOF

CLAIM OF PRIORITY

This application claims the priority to and all the benefits accruing under 35 U.S.C. 119 of Korean Patent Application No. 10-2015-0001982 filed in the Korean Intellectual Property Office (KIPO) on Jan. 7, 2015, the entire contents of which are incorporated herein by reference.

BACKGROUND OF THE INVENTION

Field of Disclosure

Embodiments of the present invention relates to a liquid crystal display and a driving method, and more particularly, to a liquid crystal display using an RM alignment layer and a driving method thereof.

Description of the Related Art

A liquid crystal display (LCD) which is one of the most common types of flat panel displays currently in use, includes two display panels with electrodes and a liquid crystal layer interposed therebetween. The liquid crystal display generates an electric field by applying a voltage to the electrodes to realign liquid crystal molecules of the liquid crystal layer and thus controls transmittance of light so as to display images.

The liquid crystal display has an advantage of facilitating a reduction in thickness, but has a disadvantage that side visibility deteriorates as compared with front visibility. As a result, in order to solve the disadvantage, various types of alignments of the liquid crystal and driving methods have been developed. As a method for implementing such a wide viewing angle, a liquid crystal display in which a pixel electrode and a common electrode are formed on one substrate has received attention.

Recently, a liquid crystal display using a reactive mesogen (RM) alignment layer has been developed. The liquid crystal display using the RM alignment layer has an effect of increasing transmittance as compared with an existing liquid crystal display due to low anchoring energy of the RM alignment layer. However, in the liquid crystal display using the RM alignment layer, at a high gray, there is a problem in that yellowish side illumination is viewed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a liquid crystal display and a driving method thereof having advantages of preventing a yellowish side illumination in the liquid crystal display using an RM alignment layer.

An exemplary embodiment of the present invention provides a liquid crystal display including: a liquid crystal panel assembly including a plurality of pixels; a data driver applying data voltages to a plurality of data lines connected to the plurality of pixels; and a signal controller generating image data signals to provide the generated image data signals to the data driver, in which the plurality of pixels includes a reactive mesogen (RM) alignment layer formed on a display panel, and the signal controller generates the image data signals by adjusting the data voltage with the maximum gray applied to the blue pixel to be decreased by a predetermined level.

The signal controller may generate the image data signals so that the data voltage with the maximum gray applied to the blue pixel is adjusted to a high voltage during a changeable period when a ratio of luminance of blue for a y coordinate of the color coordinate of blue is changed.

The signal controller may generate the image data signals so that the data voltages with a maximum gray applied to a red pixel and a green pixel are maintained at an original data voltage.

The signal controller may generate the image data signals so that the data voltage with the maximum gray applied to the red pixel is adjusted to the high voltage during the changeable period.

The signal controller may generate the image data signals so that the data voltage with the maximum gray applied to the green pixel is adjusted to the high voltage during the changeable period.

The maximum gray may be 256 gray, and the changeable period may be 250 gray or less.

The signal controller may generate the image data signals so that the data voltage with the maximum gray applied to the blue pixel is adjusted to the high voltage of the 250 gray.

Each of the plurality of pixels may include a pixel electrode to which the data voltage is applied and a common electrode to which a common voltage is applied to form an electric field with the pixel electrode, and the pixel electrode may include a cross stem including a horizontal stem and a vertical stem and a minute branch which obliquely extends from the horizontal stem or the vertical stem.

The pixel electrode may include a first subpixel electrode and a second subpixel electrode.

When the data voltage is applied to one pixel, magnitudes of the voltage applied to the first subpixel electrode and the voltage applied to the second subpixel electrode may be different from each other.

Another exemplary embodiment of the present invention provides a driving method of a liquid crystal display including a plurality of pixels including an RM alignment layer formed on a display panel, and a plurality of gate lines and a plurality of data lines connected to the plurality of pixels, the method including: sequentially applying gate signals of a gate-on voltage to the plurality of gate lines; and applying data voltages to the plurality of data lines in response to the gate signals of the gate-on voltage, in which the plurality of pixels includes a red pixel, a green pixel, and a blue pixel, and a data voltage with a maximum gray applied to the blue pixel is adjusted by decreasing a predetermined level.

The data voltage with the maximum gray applied to the blue pixel may be adjusted to a high voltage during a changeable period when a ratio of luminance of blue for a y coordinate of the color coordinate of blue is changed.

The data voltages with a maximum gray applied to the red pixel and the green pixel may be maintained at an original data voltage.

The data voltage with the maximum gray applied to the red pixel may be adjusted to the high voltage during the changeable period.

The data voltage with the maximum gray applied to the green pixel may be adjusted to the high voltage during the changeable period.

The maximum gray may be 256 gray, and the changeable period may be 250 gray or less.

The data voltage with the maximum gray applied to the blue pixel may be adjusted to the high voltage of the 250 gray.

Each of the plurality of pixels may include a pixel electrode to which the data voltage is applied and a common electrode to which a common voltage is applied to form an electric field with the pixel electrode, and the pixel electrode may include a cross stem including a horizontal stem and a vertical stem and a minute branch which obliquely extends from the horizontal stem or the vertical stem.

The pixel electrode may include a first subpixel electrode and a second subpixel electrode.

When the data voltage is applied to one pixel, magnitudes of the voltage applied to the first subpixel electrode and the voltage applied to the second subpixel electrode may be different from each other.

According to the exemplary embodiment of the present invention, it is possible to prevent yellowish side illumination in the liquid crystal display using the RM alignment layer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
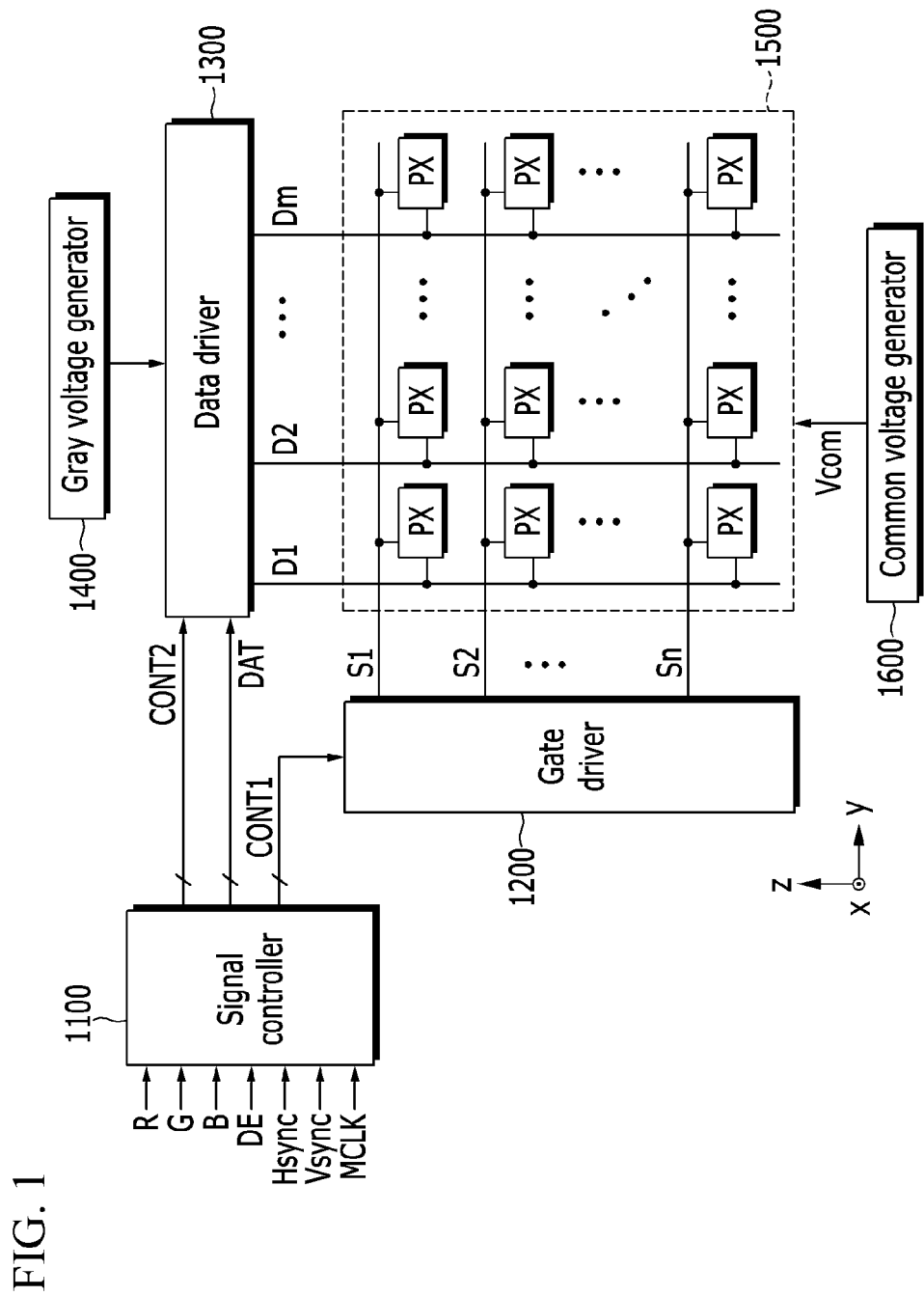
FIG. 1 is a block diagram illustrating a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in exemplary embodiments, since like reference numerals designate like elements having the same configuration, a first exemplary embodiment is representatively described, and in other exemplary embodiments, only a configuration different from the first exemplary embodiment will be described.

Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a display device according to an exemplary embodiment of the present invention will be described in detail with reference to the accompanying drawings.

FIG. 1 is a block diagram illustrating a liquid crystal display according to an exemplary embodiment of the present invention.

Referring to FIG. 1, a liquid crystal display includes a signal controller 1100, a gate driver 1200, a data driver 1300, a gray voltage generator 1400, a liquid crystal panel assembly 1500, and a common voltage generator 1600.

The liquid crystal panel assembly 1500 includes a plurality of gate lines S1-Sn, a plurality of data lines D1-Dm, and a plurality of pixels PX. The plurality of pixels PX is connected to the plurality of gate lines S1-Sn and the plurality of data lines D1-Dm to be arranged substantially in a matrix form. The plurality of gate lines S1-Sn is extended substantially in a row direction to be substantially parallel to each other. The plurality of data lines D1-Dm is extended substantially in a column direction to be substantially parallel to each other. Here, it is illustrated that only the plurality of gate lines S1-Sn and the plurality of data lines D1-Dm are connected to the plurality of pixels PX, but various signal lines such as a power line and a divided reference voltage line may be additionally connected to the plurality of pixels PX according to a structure of the pixel PX or a driving method.

Meanwhile, on a rear surface of the liquid crystal panel assembly 1500, a back light (not illustrated) controlling luminance of an image displayed on the liquid crystal panel assembly 1500 may be provided. The back light emits light to the liquid crystal panel assembly 1500.

The signal controller 1100 receives image signals R, G, and B and an input control signal. The image signals R, G, and B store luminance information of the plurality of pixels. The luminance has a predetermined number, for example, $1024(=2^{10})$, $256(=2^8)$ or $64(=2^6)$ of grays. The input control signal includes a data enable signal DE, a horizontal synchronization signal Hsync, a vertical synchronization signal Vsync, and a main clock signal MCLK.

The signal controller 1100 generates a gate control signal CONT1, a data control signal CONT2, and an image data signal DAT according to the image signals R, G, and B, the data enable signal DE, the horizontal synchronization signal Hsync, the vertical synchronization signal Vsync, and the main clock signal MCLK. The signal controller 1100 may generate an image data signal DAT by dividing the image signals R, G, and B by a frame unit according to the vertical synchronization signal Vsync and dividing the image signals R, G, and B by a gate line unit according to the horizontal synchronization signal Hsync.

When the signal controller 1100 generates the image data signal DAT, the signal controller 1100 may generate the image data signal DAT by adjusting a data voltage with a maximum gray which is applied to a blue pixel to be decreased by a predetermined level. In this case, data voltages with a maximum gray which are applied to a red pixel and a green pixel is originally maintained, or the data voltages with the maximum gray which are applied to the red pixel and the green pixel may be decreased by a predetermined level in response to the decreased level of the data voltage with the maximum gray of the blue pixel. This will be described below in FIGS. 6 to 9.

The signal controller 1100 provides the image data signal DAT and the data control signal CONT2 to the data driver 1300. The data control signal CONT2 as a signal controlling an operation of the data driver 1300 includes a horizontal synchronization start signal STH notifying the transmission start of the image data signal DAT, a load signal LOAD instructing the output of the data signal to the data lines D1-Dm, and a data clock signal HCLK. The data control signal CONT2 may further include a reverse signal RVS for inverting a voltage polarity of the image data signal DAT for the common voltage Vcom.

The signal controller 1100 provides the gate control signal CONT1 to the gate driver 1200. The gate control signal CONT1 includes at least one clock signal controlling the output of the scanning start signal STV and the gate-on voltage from the gate driver 1200. The gate control signal CONT1 may further include an output enable signal OE limiting the duration of the gate-on voltage.

The gate driver 1200 applies a gate signal, which is configured by combining a gate-on voltage and a gate-off voltage turning on and off switching elements Qa, Qb, and Qc (see FIG. 2) which is connected to the gate lines S1-Sn of the liquid crystal panel assembly 1500, respectively, to the plurality of gate lines S1-Sn.

The data driver 1300 is connected to the data lines D1-Dm of the liquid crystal panel assembly 1500 and selects a gray voltage from the gray voltage generator 1400. The data driver 1300 applies the selected gray voltage to the data lines D1-Dm as the data voltage. The gray voltage generator 1400 may provide only a predetermined number of reference gray voltages without providing voltages for all grays. In this case, the data driver 1300 may divide the reference gray voltage to generate gray voltages for all of the grays and select the data voltages among the generated gray voltages.

A difference between the data voltage applied to the pixel PX and the common voltage Vcom is represented as a charging voltage of liquid crystal capacitors Clca and Clab (see FIG. 2), that is, a pixel voltage. The alignment of the liquid crystal molecules varies according to a magnitude of the pixel voltage, and as a result, the polarization of light passing through the liquid crystal layer 3 is changed. The change in the polarization is represented as a change in transmittance of the light by a polarizer, and as a result, the pixel PX displays luminance expressed by grays of the image signals R, G, and B.

The gate signals of the gate-on voltages are sequentially applied to the plurality of gate lines S1-Sn by setting 1 horizontal period as a unit, the data voltages are applied to the plurality of data lines D1-Dm corresponding to the gate signals of the gate-on voltages. As a result, the data voltages are applied to all the pixels PX to display images in one frame. The 1 horizontal period is referred to as '1H' and the same as one period of the horizontal synchronization signal Hsync and the data enable signal DE.

When one frame ends, the next frame starts and a state of the reverse signal RVS applied to the data driver 1300 is controlled so that the polarity of the data voltage applied to each pixel PX is opposite to the polarity in the previous frame ("frame inversion"). In this case, even in one frame, according to a characteristic of the inversion signal RVS, a polarity of the data voltage applied to one data line is periodically changed (row inversion and dot inversion), or polarities of data voltages applied to one pixel row may be different from each other (column inversion and dot inversion).

The data voltage may be divided into a positive data voltage and a negative data voltage according to a polarity. The positive data voltage for the same gray is higher than the negative data voltage.

The common voltage generator 1600 generates the common voltage Vcom provided to the liquid crystal panel assembly 1500.

Each of the signal controller 1100, the gate driver 1200, the data driver 1300, the gray voltage generator 1400, and the common voltage generator 1600 described above may be directly mounted on the liquid crystal panel assembly 1500 in at least one IC chip form, mounted on a flexible printed circuit film (not illustrated), attached to the liquid crystal panel assembly 1500 in a tape carrier package (TCP) form, or mounted on a separate printed circuit board (not illustrated). Alternatively, the signal controller 1100, the gate driver 1200, the data driver 1300, the gray voltage generator 1400, and the common voltage generator 1600 may be integrated on the liquid crystal panel assembly 1500 together with the signal lines S1-Sn and D1-Dm.

Figure 2:
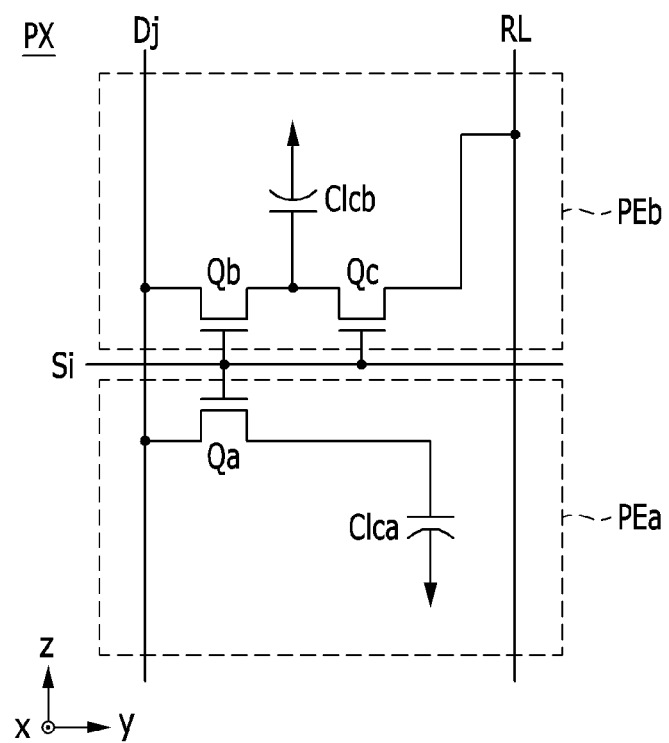
FIG. 2 is a circuit diagram illustrating one pixel in the liquid crystal display according to the exemplary embodiment of the present invention.

FIG. 2 is a circuit diagram illustrating one pixel in the liquid crystal display according to the exemplary embodiment of the present invention. A circuit structure of a pixel of the liquid crystal display and a driving method thereof according to the exemplary embodiment of the present invention will be described with reference to FIG. 2.

One pixel PX included in the liquid crystal display includes a first subpixel PEa and a second subpixel PEb. The first subpixel PEa includes a first switching element Qa and a first liquid crystal capacitor Clac. The second subpixel PEb includes a second switching element Qb, a third switching element Qc, and a second liquid crystal capacitor Clcb.

The first and second switching elements Qa and Qb are connected to a gate line Si and a data line Dj, respectively. The third switching element Qc is connected to the gate line Si, an output terminal of the second switching element Qb, and a divided reference voltage line RL. The first switching element Qa and the second switching element Qb are thin film transistors such as a three-terminal element, control terminals thereof are connected to the gate line Si and input terminals are connected to the data line Dj. The output terminal of the first switching element Qa is connected to the first liquid crystal capacitor Clca. An output terminal of the second switching element Qb is connected to the second liquid crystal capacitor Clcb and the input terminal of the third switching element Qc. The third switching element Qc is also a three-terminal element such as a thin film transistor, and a control terminal thereof is connected to the gate line Si, an input terminal thereof is connected to the second liquid crystal capacitor Clcb, and an output terminal thereof is connected to the divided reference voltage line RL.

When a gate-on signal is applied to the gate line Si, the first switching element Qa, the second switching element Qb, and the third switching element Qc which are connected to the gate line Si are turned on. In this case, the data voltage is applied to the data line Dj, and the data voltage applied to the data line Dj is applied to the first subpixel electrode of the first subpixel PEa through the turned-on first switching element Qa and applied to the first subpixel electrode of the second subpixel PEb through the turned-on second switching element Qb. Since the data voltages applied to the first subpixel electrode and the second subpixel electrode are the same as each other, the first liquid crystal capacitor Clca and the second liquid crystal capacitor Clcb are charged with the same value by a difference between the common voltage and the data voltage, but simultaneously, the voltage charged in the second liquid crystal capacitor Clcb is divided through the turned-on third switching element Qc. Accordingly, the voltage charged in the second liquid crystal capacitor Clcb is decreased by the difference between the common voltage and the divided reference voltage.

The pixel voltage of the second subpixel PEb is smaller than the pixel voltage of the first subpixel PEa. The first subpixel PEa including the first subpixel electrode may be referred to as a high pixel, and the second subpixel PEb including the second subpixel electrode may be referred to as a low pixel.

Since the voltage charged in the first liquid crystal capacitor Clca and the voltage charged in the second liquid crystal capacitor Clcb are different from each other, tilt angles of liquid crystal molecules in the first subpixel and the second subpixel are different from each other, and as a result, luminance of the two subpixels is different from each other. When the voltage of the first liquid crystal capacitor Clca and the voltage of the second liquid crystal capacitor Clcb are appropriately controlled, an image viewed from the side may be maximally approximated to an image viewed from the front, thereby improving side visibility.

Here, the circuit of the pixel as illustrated in FIG. 2 is described, but the pixel of the display device according to the exemplary embodiment of the present invention is not limited thereto and may be variously configured.

Hereinafter, a structure of the liquid crystal panel assembly 1500 of the liquid crystal display according to the exemplary embodiment of the present invention will be described with reference to FIGS. 3 to 5.

Figure 3:
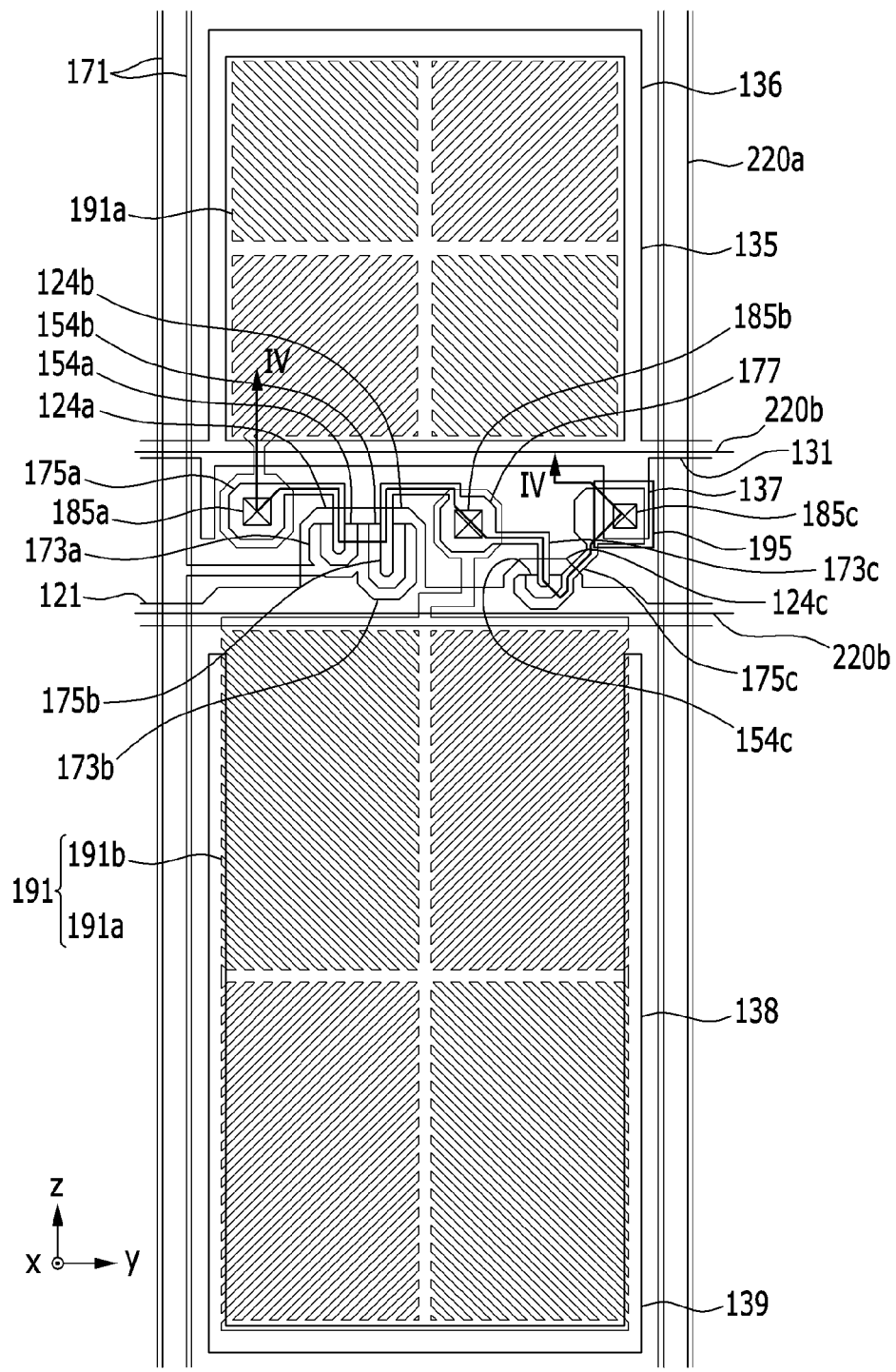
FIG. 3 is a plan view illustrating one pixel in the liquid crystal display according to the exemplary embodiment of the present invention.

FIG. 3 is a plan view illustrating one pixel in the liquid crystal display according to the exemplary embodiment of the present invention. FIG. 4 is a cross-sectional view of FIG. 3 taken along line IV-IV. FIG. 5 is a plan view illustrating a basic area of a pixel electrode in the liquid crystal display according to the exemplary embodiment of the present invention.

Figure 4:
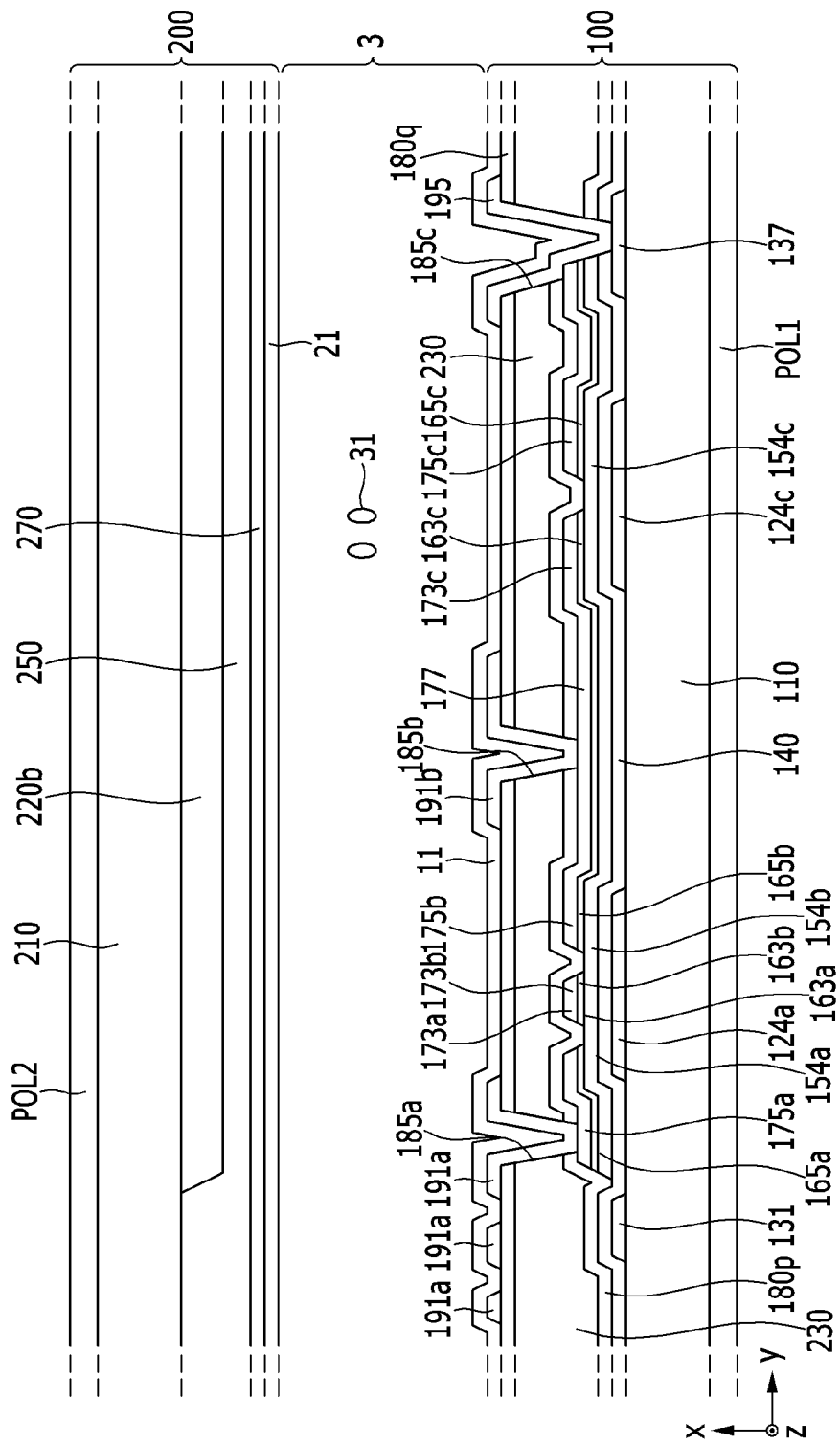
FIG. 4 is a cross-sectional view of FIG. 3 taken along line IV-IV.
Figure 5:
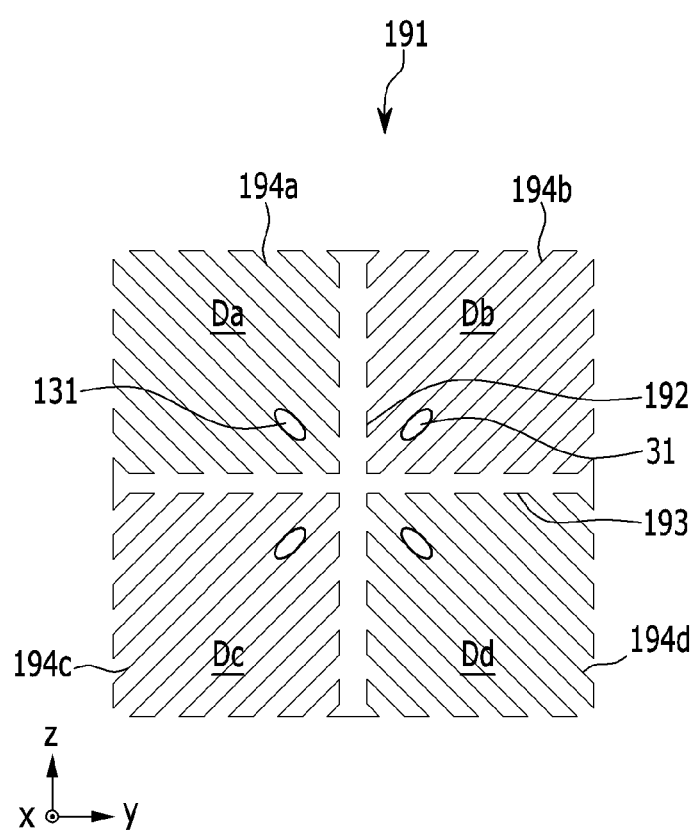
FIG. 5 is a plan view illustrating a basic area of a pixel electrode in the liquid crystal display according to the exemplary embodiment of the present invention.

Referring to FIGS. 3 to 5, the liquid crystal display includes a lower panel 100 and an upper panel 200 facing each other, and a liquid crystal layer 3 including liquid crystal molecules 31 interposed between the two panels 100 and 200. A pair of polarizers POL1 and POL2 is attached onto outer surfaces of the two panels 100 and 200.

First, the lower panel 100 will be described.

A gate conductor including a gate line 121 and a divided reference voltage line 131 is formed on a first insulation substrate 110. The gate line 121 includes a first gate electrode 124a, a second gate electrode 124b, a third gate electrode 124c, and a wide end portion (not illustrated) for connecting with other layers or an external driving circuit. The divided reference voltage line 131 includes first storage electrodes 135 and 136, and a reference electrode 137. Second storage electrodes 138 and 139 which are not connected to the divided reference voltage line 131 but overlap with the second subpixel electrode 191b are positioned.

A gate insulating layer 140 is positioned on the gate line 121 and the divided reference voltage line 131, and a first semiconductor layer 154a, a second semiconductor layer 154b, and a third semiconductor layer 154c are positioned on the gate insulating layer 140. A plurality of ohmic contacts 163a, 165a, 163b, 165b, 163c, and 165c may be positioned on the semiconductor layers 154a, 154b, and 154c.

A data conductor including a plurality of data lines 171 including a first source electrode 173a and a second source electrode 173b, a first drain electrode 175a, a second drain electrode 175b, a third source electrode 173c, and a third drain electrode 175c is positioned on the ohmic contacts 163a, 165a, 163b, 165b, 163c, and 165c and the gate insulating layer 140. The data conductor, the semiconductor positioned below the data conductor, and the ohmic contacts may be simultaneously formed by using one mask. The data line 171 includes a wide end portion for connecting with other layers or an external driving circuit and may include the semiconductor layers 154a, 154b, and 154c having the same planar shape and the ohmic contacts 163a, 165a, 163b, 165b, 163c, and 165c.

The first gate electrode 124a, the first source electrode 173a, and the first drain electrode 175a form one first thin film transistor Qa together with the first semiconductor layer 154a. A channel of the first thin film transistor Qa is formed in the first semiconductor layer 154a between the first source electrode 173a and the first drain electrode 175a.

Similarly, the second gate electrode 124b, the second source electrode 173b, and the second drain electrode 175b form one second thin film transistor Qb together with the second semiconductor layer 154b. A channel of the second thin film transistor Qb is formed on the second semiconductor layer 154b between the second source electrode 173b and the second drain electrode 175b.

The third gate electrode 124c, the third source electrode 173c and the third drain electrode 175c form one third thin film transistor Qc together with the third semiconductor layer 154c. A channel of the third thin film transistor Qc is formed on the third semiconductor layer 154c between third source electrode 173c and the third drain electrode 175c. The second drain electrode 175b is connected with the third source electrode 173c and includes an extension 177 which is widely extended.

On the data conductor 171, 173c, 175a, 175b, and 175c and the exposed portion of the semiconductor layers 154a, 154b, and 154c, a first passivation layer 180p is positioned. The first passivation layer 180p may include an inorganic insulating layer such as silicon nitride or silicon oxide. The first passivation layer 180p may prevent a pigment of the color filter 230 from flowing into the exposed portion of the semiconductor layers 154a, 154b, and 154c.

A vertical light blocking member 220a and color filters 230 are positioned on the first passivation layer 180p. Any one of the vertical light blocking member 220a and the color filters 230 may also be first positioned. The vertical light blocking member 220a may have a planar shape which is the same as or similar to that of the data line 171 and is formed to cover the data line 171.

Here, the light blocking member 220a which is vertically extended is described, but the present invention is not limited thereto, but a shielding electrode which is simultaneously formed with the pixel electrode and receives the common voltage may also be applied.

The color filters 230 extend in a vertical direction along two adjacent data lines. Two color filters 230 which are adjacent to each other may be separated from each other based on the data line 171 or overlap with each other in an adjacent region to the data line 171.

The color filter 230 may uniquely display one of the primary colors, and an example of the primary colors may include three primary colors of red, green, and blue or yellow, cyan, and magenta. Although not illustrated, the color filters 230 may further include a color filter which displays a mixed color of the primary colors or white in addition to the primary colors.

A second passivation layer 180q is positioned on the vertical light blocking member 220a and the color filters 230. The second passivation layer 180q may include an inorganic insulating layer such as silicon nitride or silicon oxide. The passivation layer 180q may prevent the color filters 230 from being lifted and suppress the liquid crystal layer 3 from being contaminated due to an organic material such as a solvent flowing from the color filter 230, thereby preventing a defect such as an afterimage which may be caused when a screen is driven.

In the first passivation layer 180p, the color filters 230, and the second passivation layer 180q, a first contact hole 185a exposing the first drain electrode 175a and a second contact hole 185b exposing the second drain electrode 175b are positioned. In the first passivation layer 180p, the second passivation layer 180q, and the gate insulating layer 140, a third contact hole 185c exposing a part of the reference electrode 137 and a part of the third drain electrode 175c is formed. The third contact hole 185c is covered by a connecting member 195. The connecting member 195 electrically connects the reference electrode 137 and the third drain electrode 175c which are exposed by the third contact hole 185c.

A plurality of pixel electrodes 191 is positioned on the second passivation layer 180q. Each pixel electrode 191 includes a first subpixel electrode 191a and a second subpixel electrode 191b which are separated from each other with the gate line 121 therebetween and adjacent to each other in a column direction based on the gate line 121. The pixel electrode 191 may be made of a transparent conductive material such as ITO or IZO, or a reflective metal such as aluminum, silver, chromium, or an alloy thereof.

Each of the first subpixel electrode 191a and the second subpixel electrode 191b includes a basic area of the pixel electrode 191 illustrated in FIG. 5 or one or more modifications thereof. The first subpixel electrode 191a is physically and electrically connected with the first drain electrode 175a through the first contact hole 185a and receives the data voltage from the first drain electrode 175a. The second subpixel electrode 191b is physically and electrically connected with the second drain electrode 175b through the second contact hole 185b and receives the data voltage from the second drain electrode 175b. A part of the data voltage applied to the second drain electrode 175b is divided through the third source electrode 173c, and as a result, a magnitude of the voltage applied to the first subpixel electrode 191a is larger than a magnitude of the voltage applied to the second subpixel electrode 191b.

The first subpixel electrode 191a and the second subpixel electrode 191b to which the data voltages are applied generate an electric field together with a common electrode 270 of the upper panel 200 to determine directions of the liquid crystal molecules of the liquid crystal layer 3 between the two electrodes 191 and 270. Luminance of light passing through the liquid crystal layer 3 varies according to the directions of the liquid crystal molecules determined above.

A lower alignment layer 11 is formed on the pixel electrode 191.

Next, the upper panel 200 will be described.

A horizontal light blocking member 220b is positioned on a second insulation substrate 210. The horizontal light blocking member 220b is called a black matrix BM and blocks light leakage. The horizontal light blocking member 220b may be positioned in a region corresponding to the gate line 121. That is, the horizontal light blocking member 220b which is extended in a row direction may be provided.

The second polarizer POL2 is disposed below the second insulation substrate 210, that is, on an opposite side of the horizontal light blocking member 220b.

An overcoat 250 is formed on the light blocking member. The overcoat 250 may be made of an organic insulating material and provides a flat surface. According to an exemplary embodiment, the capping layer 250 may be omitted.

The common electrode 270 is formed on the overcoat 250. The common electrode 270 may be made of a transparent conductor such as ITO and IZO.

An upper alignment layer 21 is formed on the common electrode 270.

The lower alignment layer 11 and the upper alignment layer 21 are reactive mesogen (RM) alignment layers. The lower alignment layer 11 and the upper alignment layer 21 may be vertical alignment layers. However, in the present invention, the lower alignment layer 11 and the upper alignment layer 21 may be limited to the RM alignment layers. Since the RM alignment layer has low anchoring energy, transmittance of the RM alignment layer may be increased by approximately 5% as compared with the vertical alignment layer.

The liquid crystal layer 3 includes a plurality of liquid crystal molecules 31, the liquid crystal molecules 31 may be aligned to have pretilts which are tilted in the same direction as a longitudinal direction of the cutout pattern of the pixel electrode 191 while the voltages are not applied to the two field generating electrodes 191 and 270.

As illustrated in FIG. 5, the overall shape of the pixel electrode 191 is a quadrangle and includes a cross stem configured by a horizontal stem 193 and a vertical stem 192 perpendicular to the horizontal stem 193. The pixel electrode 191 is divided into a first domain Da, a second domain Db, a third domain Dc, and a fourth domain Dd by the horizontal stem 193 and the vertical stem 192. The domains Da, Db, Dc, and Dd include a plurality of first minute branches 194a, a plurality of second minute branches 194b, a plurality of third minute branches 194c, and a plurality of fourth minute branches 194d, respectively.

The first minute branches 194a extend obliquely in an upper left direction from the horizontal stem 193 or the vertical stem 192, and the second minute branches 194b extend obliquely in an upper right direction from the horizontal stem 193 or the vertical stem 192. Further, the third minute branches 194c extend obliquely in a lower left direction from the horizontal stem 193 or the vertical stem 192, and the fourth minute branches 194d extend obliquely in a lower right direction from the horizontal stem 193 or the vertical stem 192.

The first to fourth minute branches 194a, 194b, 194c, and 194d may form an angle of approximately 45° or 135° with the gate lines 121*a* and 121*b* or the horizontal stem 193. Further, the minute branches 194*a*, 194*b*, 194*c*, and 194*d* of two adjacent domains Da, Db, Dc, and Dd may be perpendicular to each other.

Widths of the minute branches 194*a*, 194*b*, 194*c*, and 194*d* may be about 2.5 μm to about 5.0 μm, and a distance between the adjacent minute branches 194*a*, 194*b*, 194*c*, and 194*d* in one domain Da, Db, Dc, or Dd may be about 2.5 μm to about 5.0 μm.

According to another exemplary embodiment of the present invention, widths of the minute branches 194*a*, 194*b*, 194*c*, and 194*d* may be increased toward the horizontal stem 193 or the vertical stem 192, and a difference between a portion having the largest width and a portion having the smallest width of one of the minute branches 194*a*, 194*b*, 194*c*, and 194*d* may be 0.2 μm to 1.5 μm.

Hereinafter, a process of tuning a color coordinate of the liquid crystal display using the RM alignment layer according to the present invention will be described with reference to FIGS. 6 and 7.

Figure 6:
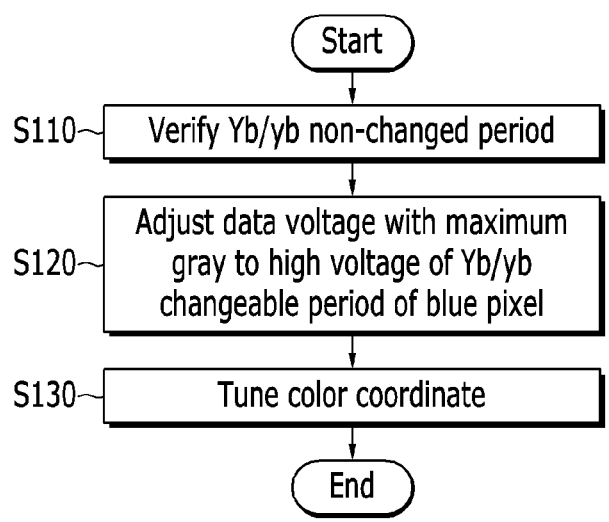
FIG. 6 is a flowchart illustrating a process of tuning a color coordinate in the liquid crystal display according to the exemplary embodiment of the present invention.

FIG. 6 is a flowchart illustrating a process of tuning a color coordinate in the liquid crystal display according to the exemplary embodiment of the present invention. FIG. 7 is a graph illustrating a Y/y value for a data voltage in a liquid crystal display using an RM alignment layer.

An example in which a plurality of pixels included in the liquid crystal panel assembly 1500 is configured by a red pixel, a green pixel, and a blue pixel will be described with reference to FIGS. 6 and 7.

Before tuning the color coordinate of the liquid crystal display, a non-changed region of Yb/yb of the blue pixel is verified (S110).

Generally, a y coordinate of the color coordinate may be represented as Equation 1.

$$y = \frac{Y}{X+Y+Z} = \frac{Yr + Yg + Yb}{Yr/yr + Yg/yg + Yb/yb} \quad \text{(Equation 1)}$$

Here, X, Y, and Z represent tristimulus values, Yr represents luminance of red, Yg represents luminance of green, Yb represents luminance of blue, yr represents a y coordinate of red, yg represents a y coordinate of green, and yb represents a y coordinate of blue. Yr/yr represents a ratio of luminance of red Yr to the y coordinate of red, Yg/yg represents a ratio of luminance of green Yg to the y coordinate of green, and Yb/yb represents a ratio of luminance of blue Yb to the y coordinate of blue. Since the plurality of pixels included in the liquid crystal panel assembly 1500 is configured by the red pixel, the green pixel, and the blue pixel, Yr/yr, Yg/yg, and Yb/yb correspond to the red pixel, the green pixel, and the blue pixel, respectively.

Changes of Yr/yr, Yg/yg, and Yb/yb with respect to the data voltages applied to the plurality of pixels may be measured. FIG. 7 illustrates changes of Yr/yr, Yg/yg, and Yb/yb when the data voltage is changed from a data voltage V235 of 235 gray and a data voltage V256 of 256 gray in the liquid crystal display with 256 gray.

Figure 7:
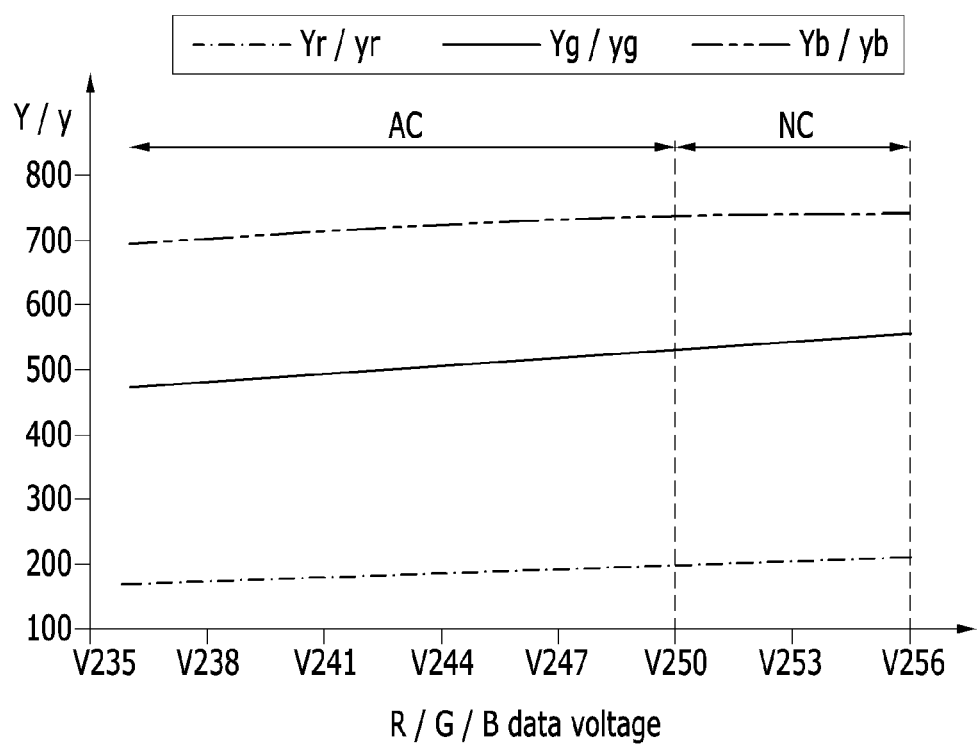
FIG. 7 is a graph illustrating a Y/y value for a data voltage in a liquid crystal display using an RM alignment layer.

Referring to FIG. 7, it can be seen that a Yr/yr value of the red pixel and a Yg/yb value of the green pixel are almost uniformly changed as the data voltage is changed. Meanwhile, it can be seen that when the data voltage is changed between a data voltage V250 of 250 gray and a data voltage V256 of 256 gray, a Yb/yb value of the blue pixel is almost not changed. A period when the Yb/yb value of the blue pixel is not changed is called a Yb/yb non-changed period NC of the blue pixel. It can be seen that the Yb/yb value of the blue pixel is changed in a period when the data voltage is lower than the data voltage V250 of 250 gray. A period when the Yb/yb value of the blue pixel is changed is called a Yb/yb changeable period AC of the blue pixel.

The Yb/yb non-changed period NC of the blue pixel means a period when luminance of blue is almost not changed even though the y coordinate of blue is adjusted. When the color coordinate is tuned while the Yb/yb non-changed period NC of the blue pixel is disregarded, in the process of tuning the color coordinate, the data voltage with the maximum gray is applied to the blue pixel and the y coordinate is adjusted. In the Yb/yb non-changed period NC of the blue pixel, the luminance of blue is almost not changed, and as a result, the y coordinate may be excessively adjusted. In this case, after tuning the color coordinate, a period when a change amount of the y coordinate of a side color coordinate is rapidly changed is generated. As an example, FIG. 8 is exemplified.

Figure 8:
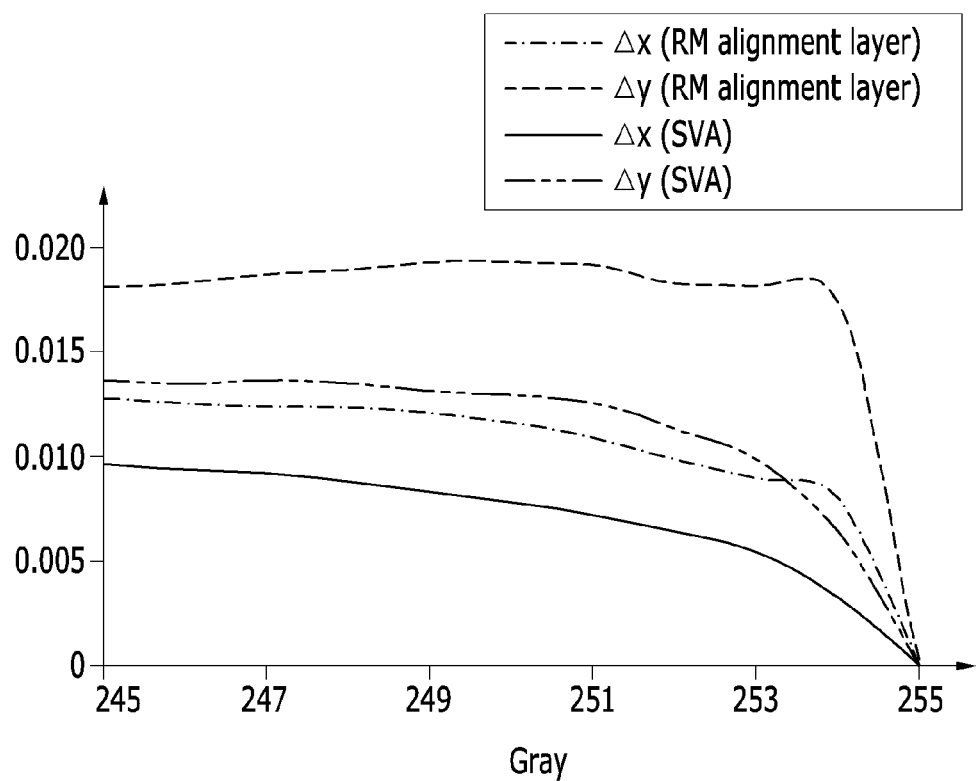
FIG. 8 is a graph illustrating a change amount of the color coordinate according to grays when a data voltage with a maximum gray of a blue pixel is not adjusted.

FIG. 8 is a graph illustrating a change amount of the color coordinate according to grays when a data voltage with a maximum gray of a blue pixel is not adjusted.

Referring to FIG. 8, change amounts Δx(SVA) and Δy(SVA) of the side color coordinate of the liquid crystal display using the vertical alignment layer are lower than 0.015 and are not rapidly changed according to grays. On the other hand, a period when Δy(RM alignment layer) of change amounts Δx(RM alignment layer) and Δy(RM alignment layer) of the side color coordinate of the liquid crystal display using the RM alignment layer is close to 0.02 and rapidly changed according to grays is generated. As such, yellowish side illumination is viewed by a period when the change amount Δy of the y coordinate of the side color coordinate is rapidly changed. The yellowish side illumination occurs at approximately 250 gray or more.

Figure 9:
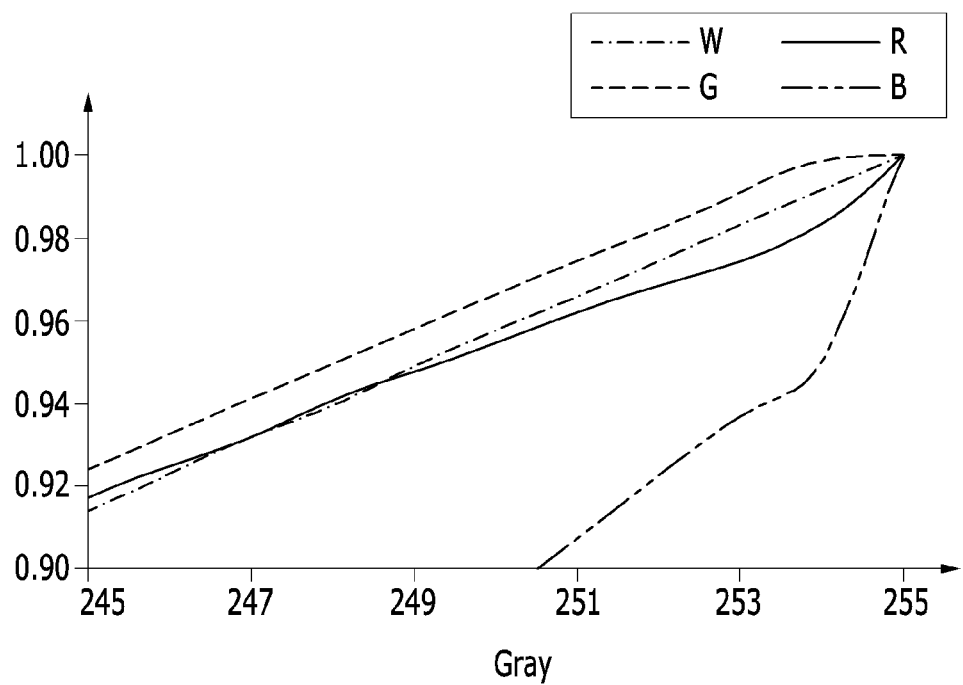
FIG. 9 is a graph illustrating a gamma curve when a data voltage with a maximum gray of a blue pixel is not adjusted.

When the color coordinate is tuned while the Yb/yb non-changed period NC of the blue pixel is disregarded, gamma curves of red, green, and blue are measured and illustrated in FIG. 9.

FIG. 9 is a graph illustrating a gamma curve when a data voltage with a maximum gray of a blue pixel is not adjusted. Referring to FIG. 9, a period when luminance of blue B is rapidly reduced as compared with luminance of red R and green G may be verified. As the luminance of blue B is rapidly reduced, the yellowish side illumination may be expressed.

Referring back to FIGS. 6 and 7, a period when the yellowish side illumination is viewed corresponds to the Yb/yb non-changed period NC of the blue pixel. In order to prevent the yellowish side illumination, the data voltage V256 with the maximum gray (256 gray) is adjusted to a high voltage of the Yb/yb changeable period AC of the blue pixel (S120). That is, the data voltage V256 with the 256 gray for the blue pixel is adjusted to the data voltage V250 of 250 gray.

As such, the data voltage with the maximum gray may be adjusted by decreasing a predetermined level. It is preferred that the data voltage with the maximum gray is adjusted to the high voltage of the Yb/yb changeable period AC of the blue pixel, but unlike this, the data voltage with the maximum gray may also be adjusted by further decreasing or increasing a predetermined level than the high voltage of the Yb/yb changeable period AC of the blue pixel.

Meanwhile, by adjusting the data voltage V256 with the maximum gray (256 gray) to the high voltage of the Yb/yb changeable period AC of the blue pixel, only the data voltage with the maximum gray for the blue pixel may be adjusted to the high voltage of the Yb/yb changeable period AC of the blue pixel. Further, the data voltages with the maximum gray for the red pixel and the green pixel in addition to the blue pixel may also be adjusted to the high voltage of the Yb/yb changeable period AC of the blue pixel.

The color coordinate tuning is performed by applying the adjusted data voltage V250 to the blue pixel and adjusting the y coordinate (S130). In the Yb/yb changeable period AC of the blue pixel, since the luminance of blue is changed by adjusting the y coordinate of blue, the period when the luminance of blue is rapidly reduced is not generated, and the yellowish side illumination may be prevented.

Table 1 illustrates a result obtained by measuring x and y values of a front color coordinate and change amounts of the side coordinate in a case (Case A) where the data voltage with the maximum gray applied to the blue pixel is not changed in the liquid crystal display using RM alignment layer, a case (Case B) where the data voltage with the maximum gray applied to the blue pixel is changed to the high voltage of the Yb/yb changeable period AC as described above, and a case (Case C) of a liquid crystal display using the vertical alignment layer.

TABLE 1

|  |  | A | | B | | C | |
| --- | --- | --- | --- | --- | --- | --- | --- |
|  |  | x | y | x | y | x | y |
| Front side(Full white) | | 0.2792 | 0.3079 | 0.2786 | 0.3065 | 0.2734 | 0.2969 |
| Side Δ (Full wihte) | 254 gray | 0.011 | 0.024 | 0.005 | 0.010 | 0.003 | 0.007 |
| | 250 gray | 0.014 | 0.025 | 0.009 | 0.014 | 0.008 | 0.013 |

It can be seen that as compared with the case (Case A) where the data voltage with the maximum gray applied to the blue pixel is not changed, the change amount of the side color coordinate is reduced in the case (Case B) where the data voltage with the maximum gray applied to the blue pixel is changed to the high voltage of the Yb/yb changeable period AC. This is similar to the case (Case C) of the liquid crystal display using the vertical alignment layer in which the yellowish side illumination is not viewed. Therefore, the side color coordinate of the liquid crystal display using the vertical alignment layer may have an effect to improve transmittance of the RM alignment layer while being maintained to be similar to that of the liquid crystal display using the vertical alignment layer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1100: Signal controller
1200: Gate driver
1300: Data driver
1400: Gray voltage generator
1500: Liquid crystal panel assembly
1600: Common voltage generator

What is claimed is:

1. A liquid crystal display, comprising:
a liquid crystal panel assembly including a plurality of pixels,
a data driver applying data voltages to a plurality of data lines connected to the plurality of pixels; and
a signal controller generating image data signals to provide the generated image data signals to the data driver, and
the plurality of pixels including a red pixel, a green pixel, and a blue pixel, and at least one reactive mesogen (RM) alignment layer formed on a display panel, the signal controller generating the image data signals by adjusting the data voltage such that a maximum gray applied to the blue pixel is decreased by a predetermined level.

2. The liquid crystal display of claim 1, wherein:
the signal controller generates the image data signals so that the data voltage with the decreased maximum gray applied to the blue pixel is adjusted to a high voltage during a changeable period when a ratio of luminance of blue for a y coordinate of a color coordinate of blue is changed.

3. The liquid crystal display of claim 2, wherein:
the signal controller generates the image data signals so that the data voltages with a maximum gray applied to a red pixel and a green pixel are maintained at an original data voltage.

4. The liquid crystal display of claim 2, wherein:
the signal controller generates the image data signals so that the data voltage with the maximum gray applied to the red pixel is adjusted to the high voltage during the changeable period.

5. The liquid crystal display of claim 2, wherein:
the signal controller generates the image data signals so that the data voltage with the maximum gray applied to the green pixel is adjusted to the high voltage during the changeable period.

6. The liquid crystal display of claim 2, wherein:
the maximum gray is a level of 256, and the high voltage corresponds to a gray level of 250 or less.

7. The liquid crystal display of claim 6, wherein:
the signal controller generates the image data signals so that the data voltage with the maximum gray applied to the blue pixel is adjusted to the high voltage corresponding to a gray level of 250.

8. The liquid crystal display of claim 1, wherein:
each of the plurality of pixels includes a pixel electrode to which the data voltage is applied and a common electrode to which a common voltage is applied to form an electric field with the pixel electrode, and
the pixel electrode includes a cross stem including a horizontal stem and a vertical stem and a branch which obliquely extends from the horizontal stem or the vertical stem.

9. The liquid crystal display of claim 8, wherein:
the pixel electrode includes a first subpixel electrode and a second subpixel electrode.

10. The liquid crystal display of claim 9, wherein:
when the data voltage is applied to one pixel, magnitudes of the voltage applied to the first subpixel electrode and the voltage applied to the second subpixel electrode are different from each other.

11. A driving method of a liquid crystal display including a plurality of pixels including at least one reactive mesogen (RM) alignment layer formed on a display panel, and a plurality of gate lines and a plurality of data lines connected to the plurality of pixels, the method comprising:

sequentially applying gate signals of a gate-on voltage to the plurality of gate lines; and applying data voltages to the plurality of data lines in response to the gate signals of the gate-on voltage, and the plurality of pixels including a red pixel, a green pixel, and a blue pixel, and a data voltage with a maximum gray applied to the blue pixel is adjusted by decreasing the maximum gray by a predetermined level.

12. The driving method of claim 11, wherein:
the data voltage with the decreased maximum gray applied to the blue pixel is adjusted to a high voltage during a changeable period when a ratio of luminance of blue for a y coordinate of a color coordinate of blue is changed.

13. The driving method of claim 12, wherein:
the data voltages with a maximum gray applied to the red pixel and the green pixel are maintained at an original data voltage.

14. The driving method of claim 12, wherein:
the data voltage with the maximum gray applied to the red pixel is adjusted to the high voltage during the changeable period.

15. The driving method of claim 12, wherein:
the data voltage with the maximum gray applied to the green pixel is adjusted to the high voltage during the changeable period.

16. The liquid crystal display of claim 12, wherein:
the maximum gray is a level of 256, and the high voltage corresponds to a gray level of 250 or less.

17. The liquid crystal display of claim 16, wherein:
the data voltage with the maximum gray applied to the blue pixel is adjusted to the high voltage corresponding to a gray level of 250.

18. The driving method of claim 11, wherein:
each of the plurality of pixels includes a pixel electrode to which the data voltage is applied and a common electrode to which a common voltage is applied to form an electric field with the pixel electrode, and the pixel electrode includes a cross stem including a horizontal stem and a vertical stem and a branch which obliquely extends from the horizontal stem or the vertical stem.

19. The driving method of claim 18, wherein:
the pixel electrode includes a first subpixel electrode and a second subpixel electrode.

20. The driving method of claim 19, wherein:
when the data voltage is applied to one pixel, magnitudes of the voltage applied to the first subpixel electrode and the voltage applied to the second subpixel electrode are different from each other.

* * * * *